United States Patent
Sawada et al.

(10) Patent No.: US 10,656,314 B2
(45) Date of Patent: May 19, 2020

(54) MOLDED ARTICLE, THERMOPLASTIC RESIN COMPOSITION, AND DISPLAY DEVICE

(71) Applicant: Mitsubishi Chemical Corporation, Chiyoda-ku (JP)

(72) Inventors: Tadayoshi Sawada, Tokyo (JP); Yoshiaki Murayama, Tokyo (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 77 days.

(21) Appl. No.: 15/536,047

(22) PCT Filed: Dec. 15, 2015

(86) PCT No.: PCT/JP2015/084989
§ 371 (c)(1),
(2) Date: Jun. 14, 2017

(87) PCT Pub. No.: WO2016/098746
PCT Pub. Date: Jun. 23, 2016

(65) Prior Publication Data
US 2018/0003871 A1    Jan. 4, 2018

(30) Foreign Application Priority Data
Dec. 18, 2014 (JP) .................. 2014-255664

(51) Int. Cl.
| | | |
|---|---|---|
| *G02B 5/22* | (2006.01) | |
| *C08K 5/08* | (2006.01) | |
| *C08K 5/3465* | (2006.01) | |
| *C08L 101/00* | (2006.01) | |
| *C08J 5/00* | (2006.01) | |
| *C08K 5/3447* | (2006.01) | |
| *C08K 5/00* | (2006.01) | |
| *F21V 9/08* | (2018.01) | |
| *C08K 5/3417* | (2006.01) | |

(52) U.S. Cl.
CPC ............... *G02B 5/223* (2013.01); *C08J 5/00* (2013.01); *C08K 5/0041* (2013.01); *C08K 5/08* (2013.01); *C08K 5/3447* (2013.01); *C08K 5/3465* (2013.01); *C08L 101/00* (2013.01); *F21V 9/08* (2013.01); *G02B 5/22* (2013.01); *C08K 5/3417* (2013.01)

(58) Field of Classification Search
None
See application file for complete search history.

(56) References Cited

U.S. PATENT DOCUMENTS

| | | |
|---|---|---|
| 2004/0102563 A1 | 5/2004 | Schottland et al. |
| 2007/0177084 A1* | 8/2007 | Ishitani ............. G02F 1/133528 349/117 |
| 2013/0331514 A1 | 12/2013 | Kaito et al. |
| 2015/0247037 A1 | 9/2015 | Sugioka et al. |

FOREIGN PATENT DOCUMENTS

| | | |
|---|---|---|
| JP | 2000-327880 A | 11/2000 |
| JP | 2001-240733 A | 9/2001 |
| JP | 2009-131970 A | 6/2009 |
| JP | 2010-002704 A | 1/2010 |
| JP | 2011-12247 A | 1/2011 |
| JP | 2013-28053 A | 2/2013 |
| JP | 2013-124273 A | 6/2013 |
| JP | 2013-209585 A | 10/2013 |
| WO | 2014/061429 A1 | 4/2014 |

OTHER PUBLICATIONS

International Search Report dated Mar. 22, 2016 in PCT/JP2015/084989 filed Dec. 15, 2015.
Extended European search report dated Jun. 21, 2018 in Patent Application No. 15869951.2, 8 pages.
Data Sheet of MACROLEX® Yellow 6G Gran.
Data Sheet of MACROLEX® Violet 3R Gran.
Office Action dated Jul. 9, 2019, in Japanese Patent Application No. 2015-562987 (w/ computer-generated English translation).
European Office Action dated Dec. 4, 2019, in European Patent Application No. 15869951.2.

* cited by examiner

Primary Examiner — Robert T Butcher
(74) Attorney, Agent, or Firm — Oblon, McClelland, Maier & Neustadt, L.L.P.

(57) ABSTRACT

Provided is a shaped article having excellent jet blackness and also, by transmitting light with specific wavelength, can display a specific color. The shaped article is a shaped article for which the L* value of reflected light is 35 or less and the total light transmittance is 1% or less, wherein, in a wavelength range of 380 nm or more to 780 nm or less, the wavelength at which the maximum value of light transmittance is exhibited is in a range of 380 nm or more to less than 680 nm, and the expressions $T_\alpha \geq 0.1\%$ and $0\% \leq T_\beta \leq T_\alpha/2$ are satisfied, or, in a wavelength range of 380 nm or more to 780 nm or less, the wavelength at which the maximum value of light transmittance is exhibited is in a range of 680 nm or more to 780 nm or less, and the expressions $T_\beta \geq 10\%$ and $0\% \leq T_\alpha \leq T_\beta/2$ are satisfied. In the expressions, $T_\alpha$ is the maximum value of light transmittance in a wavelength range of 380 nm or more to less than 680 nm, and $T_\beta$ is the maximum value of light transmittance in a wavelength range of 680 nm or more to 780 nm or less.

18 Claims, 5 Drawing Sheets

MOLDED ARTICLE, THERMOPLASTIC RESIN COMPOSITION, AND DISPLAY DEVICE

TECHNICAL FIELD

The present invention relates to a shaped article, a thermoplastic resin, and a display device.

The application is based on Japanese Patent Application 2014-255664 which has been filed in Japan on Dec. 18, 2014, and the disclosure of which is incorporated herein by reference in its entirety.

BACKGROUND ART

From the viewpoint that exterior parts of an automobile including filler, garnish, front grille, bumper, and mold are required to have excellent outer appearance and weather resistance, a shaped article of a thermoplastic resin such as an acrylonitrile-styrene-acrylic resin (ASA resin), an acrylonitrile-ethylene-styrene resin (AES resin), or an acrylic resin is used therefor.

For use like those exterior parts of an automobile, excellent jet blackness may be required from the viewpoint of the design or decorative property. In response to such requirement, conventionally there have been many cases in which coating is carried out for a member of metal or resin. However, because the coating involves complex steps, has a high environmental load, and is highly expensive, there is a demand for a shaped article of a thermoplastic resin which has excellent jet blackness even without performing coating.

As a method for providing a shaped article of a thermoplastic resin with jet blackness, a method of blending carbon black is suggested in Patent Literature 1, for example. Furthermore, in Patent Literature 2, a method of blending an organic dye is suggested.

CITATION LIST

Patent Literature

Patent Literature 1: JP 2011-12247 A
Patent Literature 2: JP 2013-124273 A

SUMMARY OF THE INVENTION

Problem to be Solved by the Invention

According to the method suggested in Patent Literature 1, carbon black with high blocking property and low transparency is blended so that it is difficult to obtain sufficient jet blackness. Furthermore, because a large amount of a dye needs to be blended according to the method suggested in Patent Literature 2, the productivity is poor and cost is high.

In recent years, for use like exterior parts of an automobile or the like, it is required to have not only the excellent jet blackness but also a new function or a decorative property.

Under the circumstances, an object of the invention is to provide a shaped article having excellent jet blackness and a new function.

Means for Solving Problem

The invention includes the following aspects.

[1] A shaped article for which the L* value of reflected light is 35 or less and the total light transmittance is 1% or less,
in which, in a wavelength range of 380 nm or more to 780 nm or less, the wavelength at which the maximum value of light transmittance is exhibited is in a range of 380 nm or more to less than 680 nm, and the following Formulae (1) and (2) are satisfied.

Formula (1):
$$T_\alpha \geq 0.1\% \tag{1}$$

Formula (2):
$$0\% \leq T_\beta \leq T_\alpha/2 \tag{2}$$

[in the formulae, $T_\alpha$ is the maximum value of light transmittance in a wavelength range of 380 nm or more to less than 680 nm, and $T_\beta$ is the maximum value of light transmittance in a wavelength range of 680 nm or more to 780 nm or less].

[2] A shaped article for which the L* value of reflected light is 35 or less and the total light transmittance is 1% or less,
in which, in a wavelength range of 380 nm or more to 780 nm or less, the wavelength at which the maximum value of light transmittance is exhibited is in a range of 680 nm or more to 780 nm or less, and the following Formulae (3) and (4) are satisfied.

Formula (3):
$$T_\beta \geq 10\% \tag{3}$$

Formula (4):
$$0\% \leq T_\alpha \leq T_\beta/2 \tag{4}$$

[in the formulae, $T_\alpha$ is the maximum value of light transmittance in a wavelength range of 380 nm or more to less than 680 nm, and $T_\beta$ is the maximum value of light transmittance in a wavelength range of 680 nm or more to 780 nm or less].

[3] A thermoplastic resin composition containing:
a thermoplastic resin; and
two or more kinds of light absorbing agents having different wavelength at which the maximum value of light absorbance is exhibited in a wavelength range of 380 nm or more to 880 nm or less,
in which the light absorbing agent contains a light absorbing agent (B) which has a wavelength at which the maximum value of light absorbance is exhibited in a wavelength range of 450 nm or more to less than 700 nm and satisfies one of the following requirements 1 and 2, and the total content of the light absorbing agent (B) is 0.1 part by mass or more and 0.5 part by mass or less relative to 100 parts by mass of the thermoplastic resin.

Requirement 1:
there is only one i satisfying the following Formula (5) and the following Formula (6) is satisfied.

Formula (5):
$$\lambda(i+1) - \lambda(i) \geq 180 \text{ nm} \tag{5}$$

Formula (6):
$$\lambda(1) - 380 \text{ nm} < 180 \text{ nm} \tag{6}$$

Requirement 2:
the following Formula (5) is not satisfied and the following Formula (7) is satisfied.

Formula (5):

$$\lambda(i+1)-\lambda(i) \geq 180 \text{ nm} \tag{5}$$

Formula (7):

$$\lambda(1)-380 \text{ nm} \geq 180 \text{ nm} \tag{7}$$

[in the formulae, $\lambda(i)$ represents a wavelength of a light absorbing agent (i), which is one of the above light absorbing agent, the wavelength at which the maximum value of light absorbance is exhibited in a wavelength range of 450 nm or more to 850 nm or less, i is an integer of 1 to n, n is an integer of 2 or more which represents number of the kind of the light absorbing agent included in the thermoplastic resin composition, $\lambda(n+1)$ is 880 nm, and $\lambda(1)< \ldots <\lambda(n)$].

[4] The thermoplastic resin composition described in the above [3], in which the light absorbing agent contains a light absorbing agent (A) which has a wavelength at which the maximum value of light absorbance is exhibited in a range of 700 nm or more to 850 nm or less.

[5] The thermoplastic resin composition described in the above [4], in which total content of the light absorbing agent (A) is 0.001 part by mass or more and 1 part by mass or less relative to 100 parts by mass of the thermoplastic resin.

[6] The thermoplastic resin composition described in the above [3], in which the light absorbing agent consists only of the light absorbing agent (B).

[7] The thermoplastic resin composition described in any one of the above [3] to [6], in which content of each of the light absorbing agent (B) is 0.01 part by mass or more and 0.45 part by mass or less relative to 100 parts by mass of the thermoplastic resin.

[8] The thermoplastic resin composition described in any one of the above [3] to [7], in which the requirement 1 is satisfied.

[9] The thermoplastic resin composition described in any one of the above [3] to [7], in which the requirement 2 is satisfied.

[10] The thermoplastic resin composition described in [4] or [5], in which the light absorbing agent (A) contains a light absorbing agent that is selected from a group consisting of an anthraquinone pigment and a phthalocyanin pigment.

[11] The thermoplastic resin composition described in any one of the above [3] to [10], in which the light absorbing agent (B) contains a light absorbing agent that is selected from a group consisting of an anthraquinone dye, a perinone dye, a methine dye, and a quinophthalone dye.

[12] A shaped article obtained by molding the thermoplastic resin composition described in any one of the above [3] to [11].

[13] The shaped article described in any one of [1], [2], or [12], in which glossiness is 80% or more.

[14] A shaped article for which the L* value of reflected light is 35 or less and the total light transmittance is 1% or less, in which light emitted from a white light source becomes colored light after transmission through the shaped article.

[15] A display device including a light source and the shaped article described in any one of [1], [2], or [12], in which the shaped article is arranged so as to allow transmission of the light emitted from the light source.

[16] A display device including a red light source and a shaped article, wherein the maximum light emission intensity of the red light source is present in a wavelength range of 710 nm or more to 800 nm or less, and the shaped article is obtained by molding the thermoplastic resin composition described in [8], and the shaped article is arranged so as to allow transmission of light emitted from the red light source, and the following Formula (5') is satisfied in which i other than n does not satisfy Formula (5).

Formula (5):

$$\lambda(i+1)-\lambda(i) \geq 180 \text{ nm} \tag{5}$$

Formula (5'):

$$\lambda(n+1)-\lambda(n) \geq 180 \text{ nm} \tag{5'}$$

Effect of the Invention

The shaped article of the invention has excellent jet blackness, and also, by transmitting light with specific wavelength, can display a specific color.

The thermoplastic resin composition of the invention, allows, according to molding of the thermoplastic resin composition, obtainment of a shaped article which has excellent jet blackness, and also, by transmitting light with specific wavelength, can display a specific color.

In the display device of the invention, the shaped article of the invention is arranged so as to allow transmission of light emitted from a light source, and therefore, it has excellent jet blackness and also, by transmitting light with specific wavelength, can display a specific color.

MODE(S) FOR CARRYING OUT THE INVENTION

Hereinbelow, descriptions are given for the embodiment of the invention.

<Molded Article>

According to the shaped article of the invention, the L* value of reflected light is 35 or less and the total light transmittance is 1% or less, and, in a wavelength range of 380 nm or more to 780 nm or less, the wavelength at which the maximum value of light transmittance is exhibited is in a range of 380 nm or more to less than 680 nm, and the following Formulae (1) and (2) are satisfied.

Formula (1):

$$T_\alpha \geq 0.1\% \quad (1)$$

Formula (2):

$$0\% \leq T_\beta \leq T_\alpha/2 \quad (2)$$

Incidentally, $T_\alpha$ is the maximum value of light transmittance in a wavelength range of 380 nm or more to less than 680 nm, and $T_\beta$ is the maximum value of light transmittance in a wavelength range of 680 nm or more to 780 nm or less.

The shaped article of the invention has the L* value of reflected light of 35 or less, and preferably 30 or less. As the shaped article has the L* value of reflected light that is equal to or lower than the upper limit value, the shaped article can have excellent jet blackness.

In the invention, the L* value of reflected light is calculated from tristimulus values X, Y, and Z that are measured by spectrophotometric colorimetry (integrating sphere type, reflection measurement) in conformity with ISO 11664-4.

Total light transmittance of the shaped article of the invention is 1% or less, and preferably 0.5% or less. As the total light transmittance of the shaped article is equal to or lower than the upper value, the shaped article can have excellent jet blackness.

In the invention, the total light transmittance as transmittance of light in visible wavelength range is measured in conformity with ISO 13468-1. Incidentally, the total light transmittance of the shaped article of the invention may have a low value which is beyond the detection limit, but it is sufficient in the invention that color of light which is emitted from a light source and transmits the shaped article can be visually determined, while it is not acceptable if the color of light which is emitted from a light source and transmits the shaped article cannot be visually determined, According to the shaped article of one embodiment of the invention, in a wavelength range of 380 nm or more to 780 nm or less, the wavelength at which the maximum value of light transmittance is exhibited is in a range of 380 nm or more to less than 680 nm, and the above Formulae (1) and (2) are satisfied.

With regard to the wavelength range of 380 nm or more to 780 nm or less, as the wavelength at which the maximum value of light transmittance is exhibited is in a range of 380 nm or more to less than 680 nm, the light with a wavelength in a range of 380 nm or more to less than 680 nm can be transmitted.

Furthermore, as the above Formulae (1) and (2) are satisfied, transmitted light intensity of a shaped article is excellent.

From the viewpoint of having more excellent transmitted light intensity of a shaped article, it is preferable to satisfy the following Formulae (1') and (2').

Formula (1'):

$$T_\alpha \geq 0.2\% \quad (1')$$

Formula (2'):

$$0\% \leq T_\beta \leq T_\alpha/3 \quad (2')$$

Furthermore, according to the shaped article of the invention as another embodiment of the invention, the L* value of reflected light is 35 or less, the total light transmittance is 1% or less, and, in a wavelength range of 380 nm or more to 780 nm or less, the wavelength at which the maximum value of light transmittance is exhibited is in a range of 680 nm or more to 780 nm or less, and the following Formulae (3) and (4) are satisfied.

Formula (3):

$$T_\beta \geq 10\% \quad (3)$$

Formula (4):

$$0\% \leq T_\alpha \leq T_\beta/2 \quad (4)$$

Incidentally, $T_\alpha$ is the maximum value of light transmittance in a wavelength range of 380 nm or more to less than 680 nm, and $T_\beta$ is the maximum value of light transmittance in a wavelength range of 680 nm or more to 780 nm or less.

According to the shaped article of one embodiment of the invention, in a wavelength range of 380 nm or more to 780 nm or less, the wavelength at which the maximum value of light transmittance is exhibited is in a range of 680 nm or more to 780 nm or less, and the above Formulae (3) and (4) are satisfied.

With regard to the wavelength range of 380 nm or more to 780 nm or less, as the wavelength at which the maximum value of light transmittance is exhibited is in a range of 680 nm or more to 780 nm or less, the light with a wavelength in a range of 680 nm or more to 780 nm or less can be transmitted.

Furthermore, as the above Formulae (3) and (4) are satisfied, transmitted light intensity of a shaped article is excellent.

From the viewpoint of having more excellent transmitted light intensity of a shaped article, it is preferable to satisfy the following Formulae (3') and (4').

Formula (3'):

$$T_\beta \geq 20\% \quad (3')$$

Formula (4'):

$$0\% \leq T_\alpha \leq T_\beta/3 \quad (4')$$

Furthermore, according to the shaped article of another embodiment of the invention, the L* value of reflected light is 35 or less, the total light transmittance is 1% or less, and light emitted from a white light source becomes colored light after transmission through the shaped article.

As described herein, the white light indicates light which looks white as lights with a plurality of wavelengths are mixedly present, and colored light indicates light with specific wavelength in a visible wavelength range (for example, red light, blue light, or the like).

In the invention, the light transmittance in a wavelength range of 380 nm or more to 780 nm or less indicates the value which is obtained by transmitting light with a wavelength of 380 nm or more to 780 nm or less from a rear surface of a shaped article and measuring the light transmitted through a surface of a shaped article by using a spectrophotometric colorimeter.

Gloss of the shaped article of the invention is preferably 80% or more, and more preferably 85% or more. As the glossiness of the shaped article is equal to or more than the above lower limit, the shaped article can have excellent jet blackness.

In the invention, the glossiness is measured in conformity with ISO 2813.

Thickness of the shaped article of the invention in a transmission direction of light emitted from a light source is preferably 0.01 mm or more and 100 mm or less. It is more preferably 0.1 mm or more and 10 mm or less. As the thickness of the shaped article is equal to or more than the above lower limit, the shaped article can have excellent jet blackness. As the thickness of the shaped article is equal to or less than the above upper limit, the shaped article can have excellent transmitted light intensity.

[Method for Producing Shaped Article]

The shaped article of the invention is preferably an article obtained by molding of the thermoplastic resin composition of the invention.

As for the method for molding a shaped article, a known method can be employed, and examples thereof include a molding method using an extrusion molding, an injection molding, a blow molding, or a press molding.

<Thermoplastic Resin Composition>

The thermoplastic resin composition of the invention contains a thermoplastic resin and two or more kinds of light absorbing agents having different wavelength at which the maximum value of light absorbance is exhibited in a wavelength range of 380 nm or more to 880 nm or less.

[Thermoplastic Resin]

Examples of the thermoplastic resin include an olefin resin such as polyethylene or polypropylene; a vinyl chloride resin such as polyvinyl chloride; a styrene resin such as polystyrene; an acrylonitrile-styrene resin such as acrylonitrile-butadiene-styrene resin (ABS resin), an ASA resin, or an AES resin; a carbonate resin such as polycarbonate; and an acrylic resin such as polymethyl methacrylate.

From the viewpoint that a resin with excellent transparency is preferable to have excellent jet blackness, a vinyl chloride resin, a styrene resin, a carbonate resin, and an acrylic resin are preferable. A carbonate resin and an acrylic resin are more preferable among the thermoplastic resins. An acrylic resin is even more preferable.

The thermoplastic resin may be used either singly or in combination of two or more kinds thereof.

Examples of the acrylic resin include a homopolymer of methyl methacrylate and a copolymer containing 50% by mass or more of a methyl methacrylate unit.

From the viewpoint that a resin with excellent transparency is preferable to have excellent jet blackness, a homopolymer of methyl methacrylate and a copolymer containing 70% by mass or more of a methyl methacrylate unit are preferable among the thermoplastic resins. A homopolymer of methyl methacrylate and a copolymer containing 90% by mass or more of a methyl methacrylate unit are more preferable, and a homopolymer of methyl methacrylate is even more preferable.

The acrylic resin may be used either singly or in combination of two or more kinds thereof.

The copolymer containing a methyl methacrylate unit can be obtained by copolymerization of methyl methacrylate with other monomer which can copolymerize with methyl methacrylate. Examples of other monomer which can copolymerize with methyl methacrylate include (meth)acrylates such as methyl acrylate, ethyl (meth)acrylate, n-propyl (meth)acrylate, isopropyl (meth)acrylate, n-butyl (meth) acrylate, isobutyl (meth)acrylate, tert-butyl (meth)acrylate, n-hexyl (meth)acrylate, cyclohexyl (meth)acrylate, n-octyl (meth)acrylate, 2-ethylhexyl (meth)acrylate, phenyl (meth) acrylate, or benzyl (meth)acrylate; and aromatic vinyls such as styrene or α-methyl styrene. Meanwhile, in the present specification, the term "(meth)acrylate" means acrylate, methacrylate, or both of them.

Among other monomers which can copolymerize with methyl methacrylate, (meth)acrylate is preferable from the viewpoint of having excellent transparency of a shaped article. From the viewpoint of having excellent resistance to thermal decomposition of a shaped article, acrylate is more preferable.

Other monomer which can copolymerize with methyl methacrylate may be used either singly or in combination of two or more kinds thereof.

As a polymerization method for obtaining an acrylic resin, a known method can be employed. Examples of the polymerization method include bulk polymerization, suspension polymerization, emulsion polymerization, and solution polymerization.

Among the polymerization methods for obtaining an acrylic resin, bulk polymerization and suspension polymerization are more preferable from the viewpoint of having excellent inhibition on generation of impurities. Bulk polymerization is more preferable.

[Light Absorbing Agent]

According to the light absorbing agent of the invention, the maximum value of light absorbance in a wavelength range of 380 nm or more to 880 nm or less is present in a range of 450 nm or more to 850 nm or less. In the invention, the light absorbing agent which exhibits, in a wavelength range of 380 nm or more to 880 nm or less, the maximum value of light absorbance in a range of 700 nm or more to 850 nm or less is referred to as a light absorbing agent (A), and the light absorbing agent which exhibits, in a wavelength range of 380 nm or more to 880 nm or less, the maximum value of light absorbance in a range of 450 nm or more to less than 700 nm is referred to as a light absorbing agent (B).

In the invention, the light absorbance is measured by using a spectrophotometer.

(Light Absorbing Agent (A))

The thermoplastic resin composition of the invention may contain a light absorbing agent (A).

Examples of the light absorbing agent (A) include a near infrared ray absorbing pigment. Examples of the near infrared ray absorbing pigment include an anthraquinone pigment and a phthalocyanin pigment.

From the viewpoint of having excellent weather resistance, preferred among the light absorbing agent (A) is an anthraquinone pigment, which is a near infrared ray absorbing pigment.

The light absorbing agent (A) may be used either singly or in combination of two or more kinds thereof.

Examples of the light absorbing agent (A) include SDO series manufactured by ARIMOTO CHEMICAL CO., LTD., EXCOLOR (registered trademark) series manufactured by Nippon Shokubai Co., Ltd., and KAYASORB (registered trademark) series manufactured by Nippon Kayaku CO., LTD.

When the thermoplastic resin composition of the invention contains the light absorbing agent (A), it is preferable that only one type of the light absorbing agent (A) is used, and content of the light absorbing agent (A) is 0.001 part by mass or more and 1 part by mass or less and preferably 0.01 part by mass or more and 0.5 part by mass or less relative to 100 parts by mass of the thermoplastic resin. As the content of the light absorbing agent (A) is equal to or more than the lower limit, light transmitted through the shaped article has excellent color selectivity, and as it is equal to or less than the upper limit, the intensity of light transmitted through the shaped article is excellent.

(Light Absorbing Agent (B))

The thermoplastic resin composition of the invention may contain a light absorbing agent (B).

Examples of the light absorbing agent (B) include a dye. Examples of the dye include an anthraquinone dye, a perinone dye, a methine dye, and a quinophthalone dye.

From the viewpoint of having excellent weather resistance of a shaped article, preferred among the light absorbing agent (B) is an anthraquinone dye and a perinone dye, which are a dye.

The light absorbing agent (B) may be used either singly or in combination of two or more kinds thereof.

Examples of the anthraquinone dye include a dye with color index such as Solvent Blue 87, Solvent Blue 94, Solvent Blue 97, Solvent Green 3, Solvent Green 28, Solvent Red 52, Solvent Red 111, Disperse Red 22, Solvent Violet 13, or Solvent Violet 36.

Examples of the perinone dye include a dye with color index such as Solvent Orange 60, Solvent Red 135, or Solvent Red 179.

Examples of the methine dye include a dye with color index such as Solvent Orange 107 or Solvent Yellow 179.

Examples of the quinophthalone dye include a dye with color index such as Solvent Yellow 33, Disperse Yellow 54, or Disperse Yellow 160.

The thermoplastic resin composition of the invention contains at least one kind of the light absorbing agent (B), and content of the light absorbing agent (B) is, in terms of the total content of the light absorbing agent (B), 0.1 part by mass or more and 0.5 part by mass or less and preferably 0.15 part by mass or more and 0.35 part by mass or less relative to 100 parts by mass of the thermoplastic resin. As the content of the light absorbing agent (B) is equal to or more than the lower limit, light transmitted through the shaped article has excellent color selectivity, and as it is equal to or less than the upper limit, the intensity of light transmitted through the shaped article is excellent.

Content of each of the light absorbing agent (B) is 0.01 part by mass or more and 0.45 part by mass or less and preferably 0.02 part by mass or more and 0.4 part by mass or less relative to 100 parts by mass of the thermoplastic resin. As the content of each of the light absorbing agent (B) is equal to or more than the lower limit, light transmitted through the shaped article has excellent color selectivity, and as it is equal to or less than the upper limit, the intensity of light transmitted through the shaped article is excellent.

The thermoplastic resin composition of the invention contains two or more kinds of light absorbing agents containing at least 1 kind of the light absorbing agent (B) and having different wavelength at which the maximum value of light absorbance is exhibited in a wavelength range of 380 nm or more to 880 nm or less. Number of the kind of the light absorbing agent contained in the thermoplastic resin composition is preferably an integer of 2 or more and 20 or less. More preferably, it is an integer of 2 or more and 10 or less. Even more preferably, it is an integer of 2 or more and 5 or less. From the viewpoint of having excellent wavelength selectivity of transmitted light, it is particularly preferably an integer of 3 or more and 4 or less. According to one embodiment, the thermoplastic resin composition of the invention contains 1 kind of the light absorbing agent (A) and the light absorbing agent (B). According to another embodiment, the thermoplastic resin composition of the invention consists only of the light absorbing agent (B) without containing the light absorbing agent (A).

The thermoplastic resin composition of the invention satisfies any one of the following requirements 1 and 2.

Requirement 1:

there is only one i satisfying the following Formula (5) and the following Formula (6) is satisfied.

Formula (5):

$$\lambda(i+1)-\lambda(i) \geq 180 \text{ nm} \quad (5)$$

Formula (6):

$$\lambda(1)-380 \text{ nm} < 180 \text{ nm} \quad (6)$$

Requirement 2:

the following Formula (5) is not satisfied and the following Formula (7) is satisfied.

Formula (5):

$$\lambda(i+1)-\lambda(i) \geq 180 \text{ nm} \quad (5)$$

Formula (7):

$$\lambda(1)-380 \text{ nm} \geq 180 \text{ nm} \quad (7)$$

Incidentally, $\lambda(i)$ represents a wavelength of a light absorbing agent (i), which is one of the above light absorbing agent, the wavelength at which the maximum value of light absorbance is exhibited in a wavelength range of 450 nm or more to 850 nm or less, i is an integer of 1 to n, and n is an integer of 2 or more which represents number of the kind of the light absorbing agent included in the thermoplastic resin composition, $\lambda(n+1)$ is 880 nm, and $\lambda(1) < \lambda(2) < \ldots < \lambda(n)$.

Figure 2:
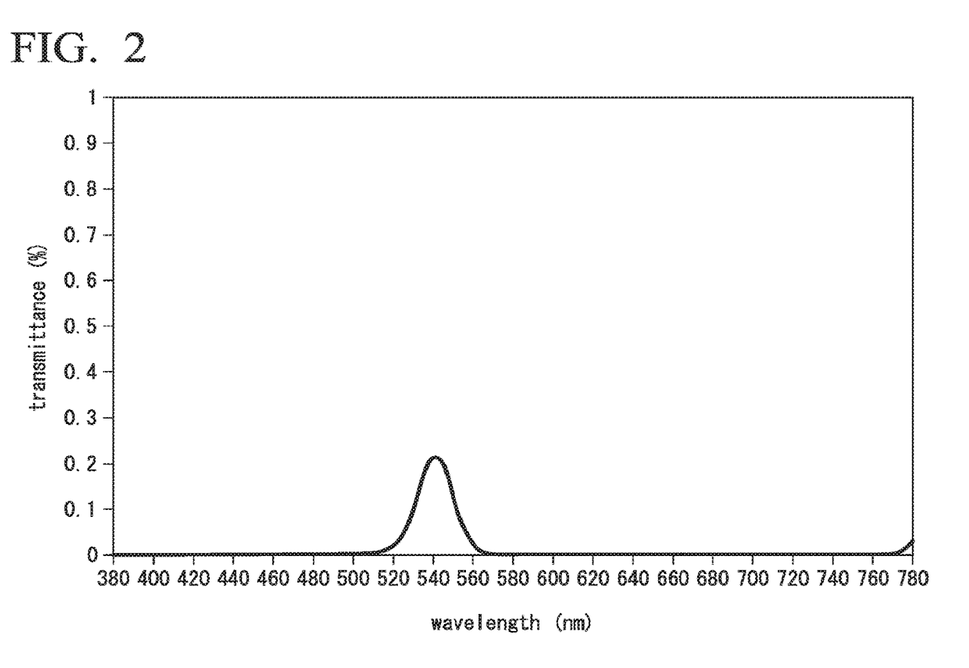
FIG. 2 is a graph illustrating transmittance of the shaped article of Example 1 for light with wavelength of 380 nm or more to 780 nm or less.

For example, the thermoplastic resin composition as a molding material of a shaped article of Example 1 which is described below contains the light absorbing agent (A) which has 755 nm as a wavelength at which the maximum value of light absorbance is exhibited, the light absorbing agent (B1) which has 690 nm as a wavelength at which the maximum value of light absorbance is exhibited, and the light absorbing agent (B6) which has 450 nm as a wavelength at which the maximum value of light absorbance is exhibited, and thus n equals to 3, $\lambda(1)$ equals to 450 nm, $\lambda(2)$ equals to 690 nm, $\lambda(3)$ equals to 755 nm, and $\lambda(4)$ equals to 880 nm.

When they are applied to the above Formula (5), only the $\lambda(2)-\lambda(1)$ satisfies the above Formula (5) and also satisfies the above Formula (6).

As a result, only the light between $\lambda(1)$ and $\lambda(2)$, that is, light with a wavelength between 450 nm and 690 nm, can be transmitted as shown in FIG. 2.

Figure 3:
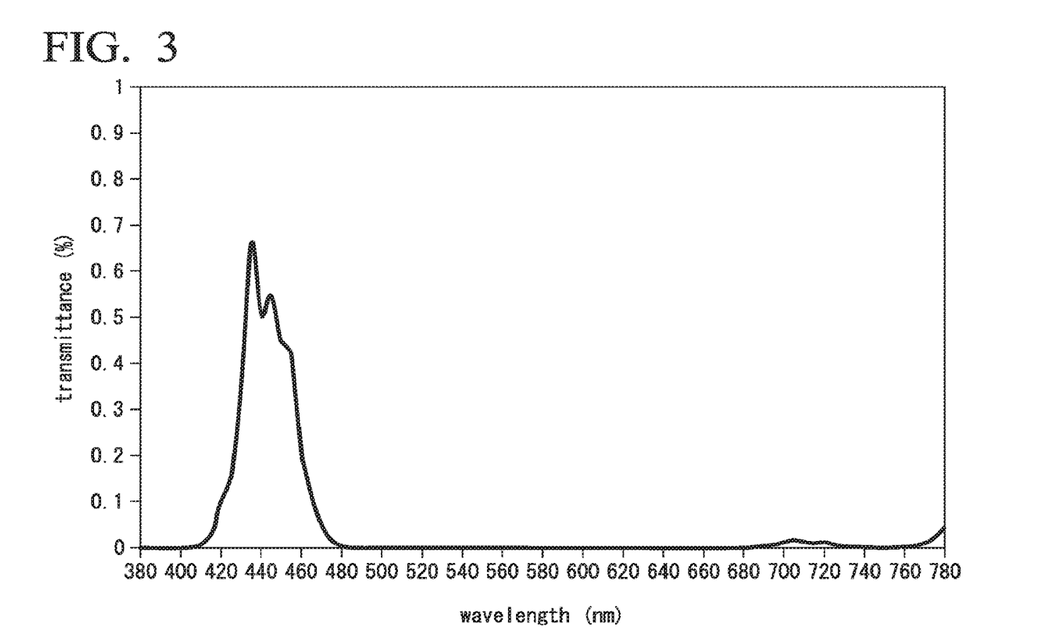
FIG. 3 is a graph illustrating transmittance of the shaped article of Example 2 for light with wavelength of 380 nm or more to 780 nm or less.
Figure 4:
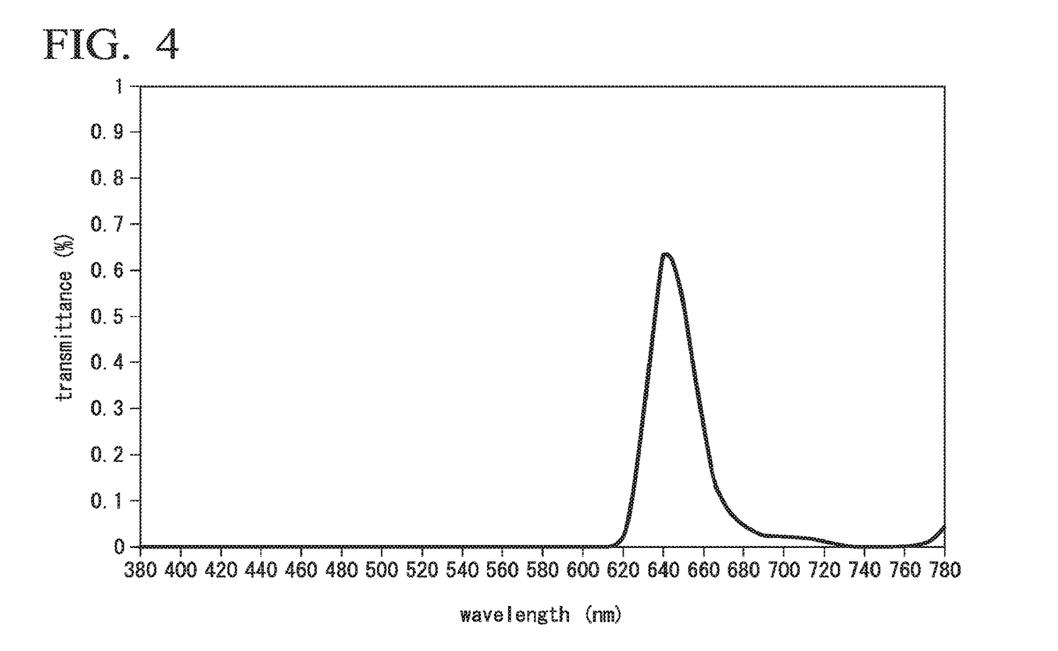
FIG. 4 is a graph illustrating transmittance of the shaped article of Example 3 for light with wavelength of 380 nm or more to 780 nm or less.
Figure 5:
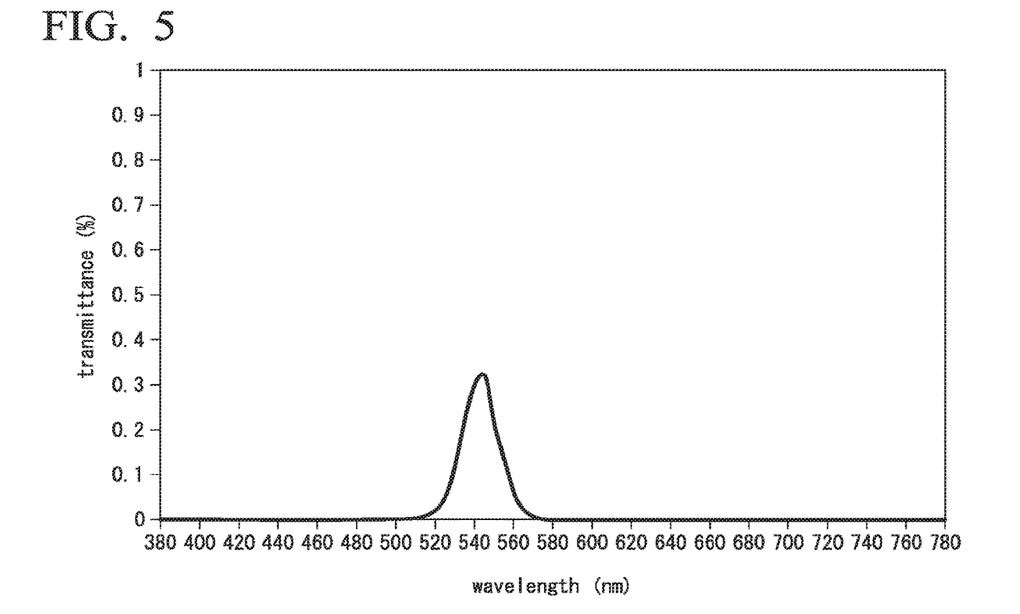
FIG. 5 is a graph illustrating transmittance of the shaped article of Example 4 for light with wavelength of 380 nm or more to 780 nm or less.
Figure 6:
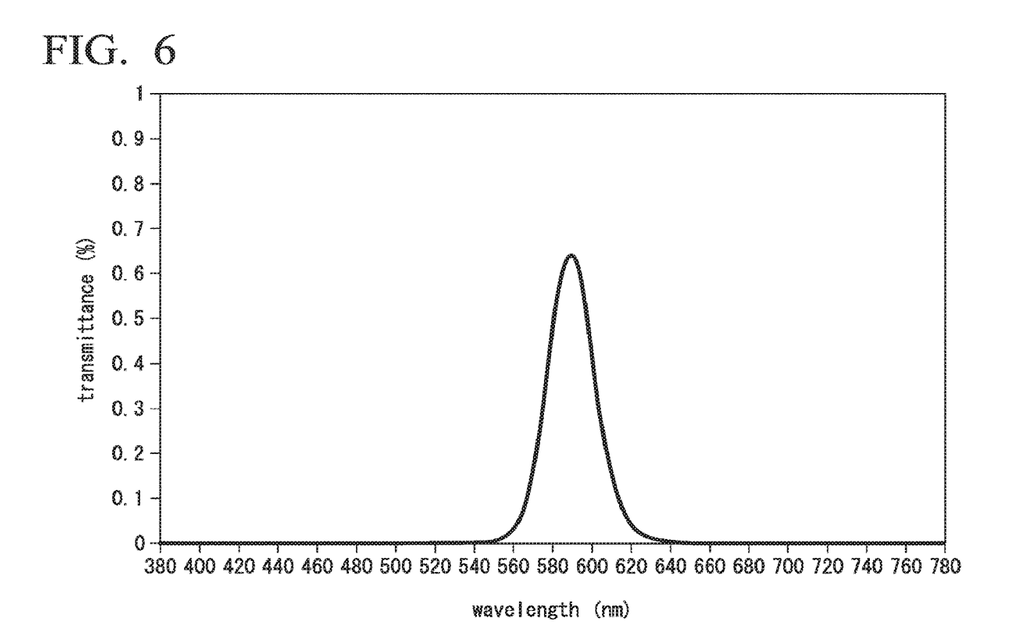
FIG. 6 is a graph illustrating transmittance of the shaped article of Example 5 for light with wavelength of 380 nm or more to 780 nm or less.
Figure 7:
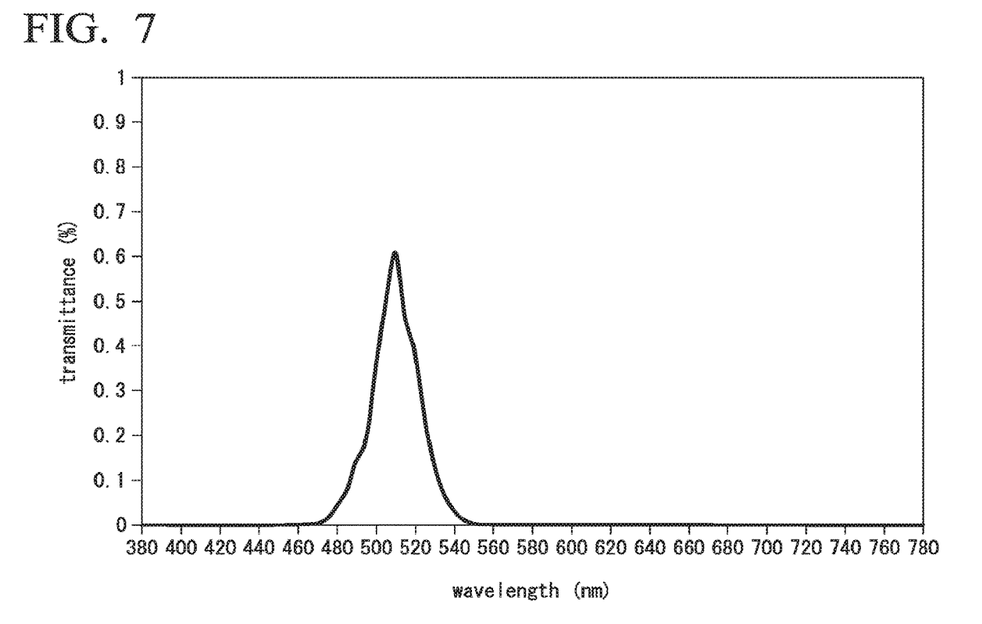
FIG. 7 is a graph illustrating transmittance of the shaped article of Example 6 for light with wavelength of 380 nm or more to 780 nm or less.

Furthermore, for example, the thermoplastic resin composition as a molding material of a shaped article of Example 2 which is described below contains the light absorbing agent (A) which has 755 nm as a wavelength at which the maximum value of light absorbance is exhibited, the light absorbing agent (B2) which has 620 nm as a wavelength at which the maximum value of light absorbance is exhibited, and the light absorbing agent (B3) which has 590 nm as a wavelength at which the maximum value of light absorbance is exhibited, and thus n equals to 3, $\lambda(1)$ equals to 590 nm, $\lambda(2)$ equals to 620 nm, $\lambda(3)$ equals to 755 nm, and $\lambda(4)$ equals to 880 nm.

When they are applied to the above Formula (5), the light absorbing agent (i) satisfying the above Formula (5) does not exist while the above Formula (7) is being satisfied.

As a result, only the light between 380 nm and λ(1), that is, light with a wavelength between 380 nm and 590 nm, can be transmitted as shown in FIG. 3.

Figure 8:
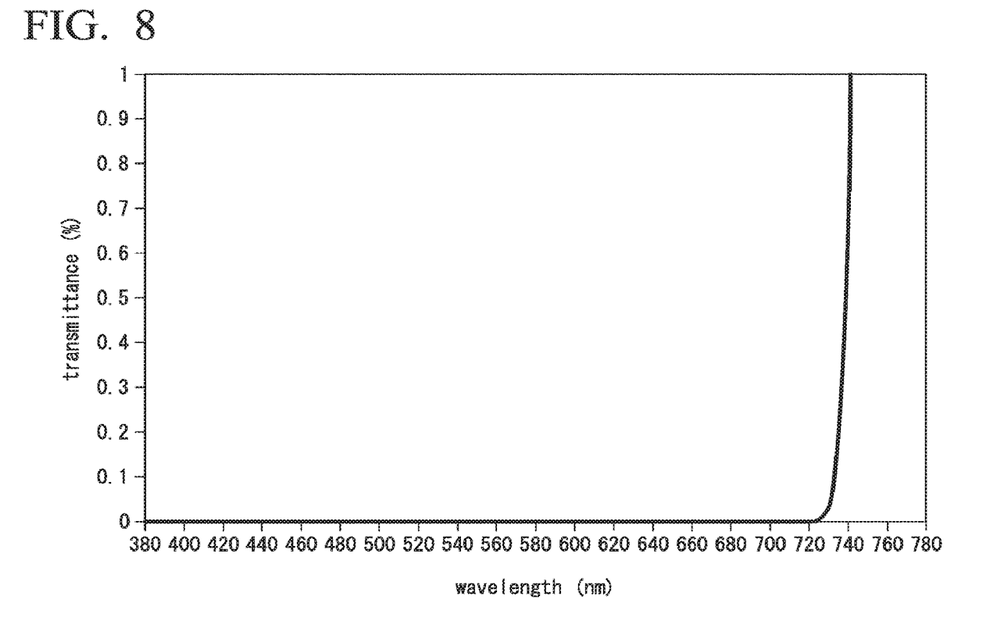
FIG. 8 is a graph illustrating transmittance of the shaped article of Example 7 for light with wavelength of 380 nm or more to 780 nm or less.
Figure 9:
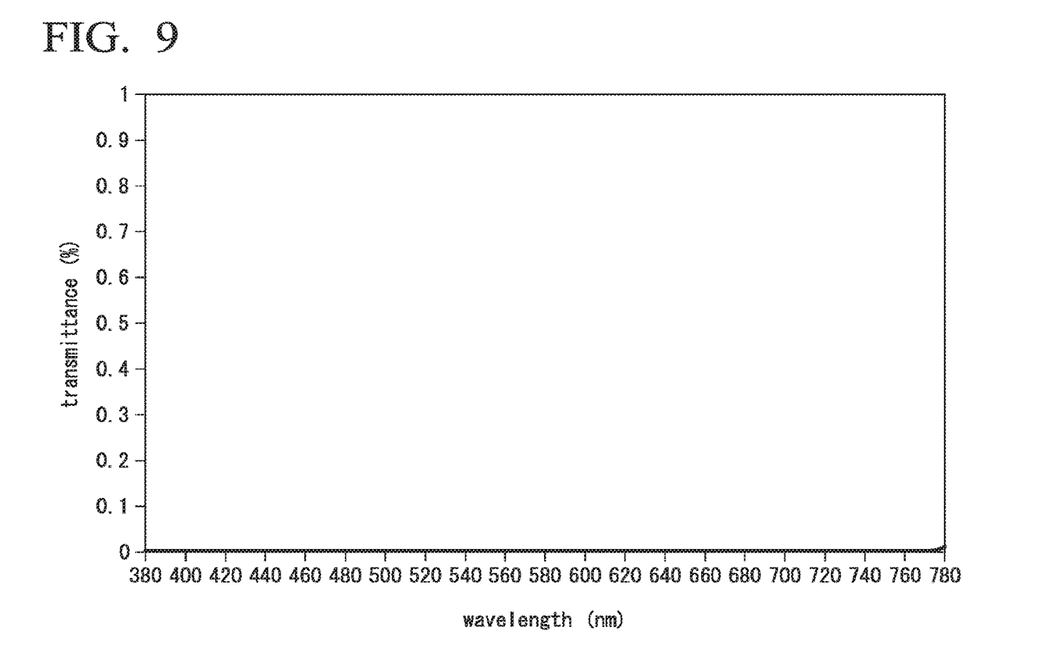
FIG. 9 is a graph illustrating transmittance of the shaped article of Comparative Example 1 for light with wavelength of 380 nm or more to 780 nm or less.
Figure 10:
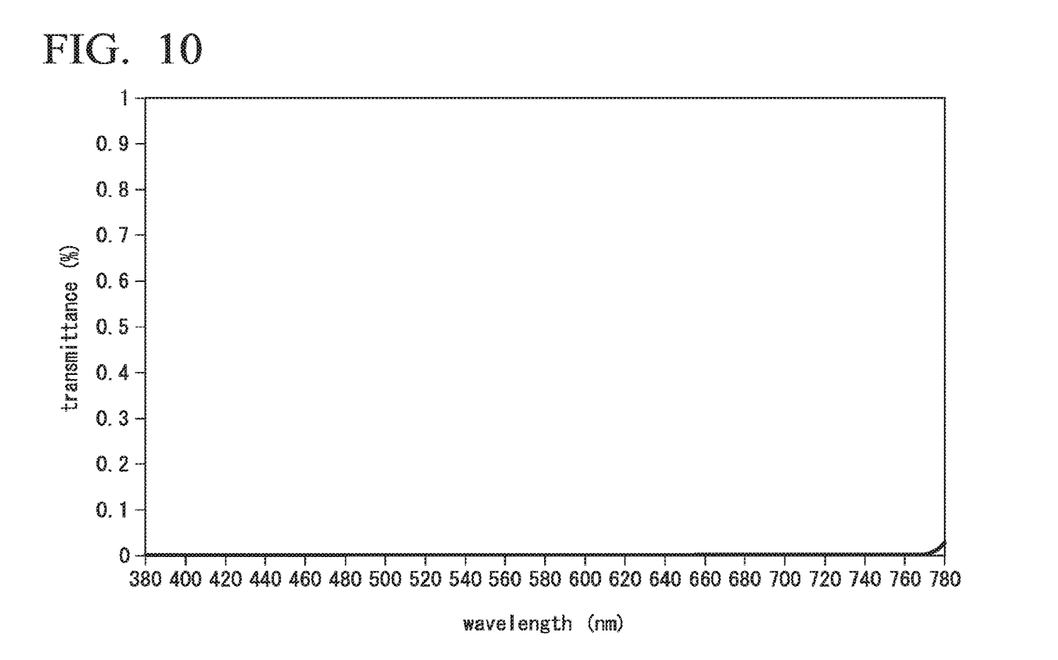
FIG. 10 is a graph illustrating transmittance of the shaped article of Comparative Example 4 for light with wavelength of 380 nm or more to 780 nm or less.

Furthermore, for example, the thermoplastic resin composition as a molding material of a shaped article of Example 7 which is described below contains the light absorbing agent (B1) which has 690 nm as a wavelength at which the maximum value of light absorbance is exhibited, the light absorbing agent (B3) which has 590 nm as a wavelength at which the maximum value of light absorbance is exhibited, and the light absorbing agent (B5) which has 480 nm as a wavelength at which the maximum value of light absorbance is exhibited, and thus n equals to 3, λ(1) equals to 480 nm, λ(2) equals to 590 nm, λ(3) equals to 690 nm, and λ(4) equals to 880 nm.

When they are applied to the above Formula (5), only the λ(4)–λ(3) satisfies the above Formula (5) and also satisfies the above Formula (6).

As a result, only the light between λ(3) and λ(4), that is, light with a wavelength between 690 nm and 880 nm, can be transmitted as shown in FIG. 8.

As shown in the above, according to the thermoplastic resin composition of the invention, when the wavelength at which the maximum value of light absorbance of two or more kinds of the light absorbing agents, which have different wavelength at which the maximum value of light absorbance is exhibited in a wavelength range of 380 nm or more to 880 nm or less, is aligned in an ascending power, the difference between any neighboring wavelengths among them, or only one of λ(1)–380 nm and 880 nm λ(n) is 180 nm or more in a wavelength range of 380 nm to 880 nm. As such, the shaped article obtained by molding the thermoplastic resin composition of the invention allows transmission of light only with a wavelength between those points. Accordingly, by transmitting white light which has been emitted from a white light source through a shaped article, the light transmitted through the shaped article can be obtained as colored light. In other words, specific color can be displayed by transmitting light with specific wavelength.

According to one embodiment of the thermoplastic resin composition of the invention, above requirement 1 is satisfied. According to this embodiment, from the viewpoint that only one i is present to satisfy λ(i+1)–λ(i)≥180 nm (Formula (5)), it is possible to obtain a shaped article which allows transmission of light having a wavelength between λ(i) and λ(i+1).

According to another embodiment of the thermoplastic resin composition of the invention, above requirement 2 is satisfied. According to this embodiment, from the viewpoint that there no i to satisfy λ(i+1)–λ(i)≥180 nm (Formula (5)) and λ(1)-380 nm is 180 nm or more, it is possible to obtain a shaped article which allows transmission of light having a wavelength between 380 nm and λ(i).

According to still another embodiment of the thermoplastic resin composition of the invention, the thermoplastic resin composition does not contain the light absorbing agent (A), above requirement 1 is satisfied, and i satisfying Formula (5) is n only. Namely, the above Formula (5') is satisfied.

$$\lambda(n+1)-\lambda(n) \geq 180 \text{ nm} \quad (5')$$

and i other than n does not satisfy Formula (5) while Formula (6) is being satisfied. According to this embodiment, from the viewpoint that λ(n+1)–λ(n) is 180 nm is more, it is possible to obtain a shaped article which allows transmission of light having a wavelength between λ(n) and 880 nm.

In the case of obtaining a shaped article of the invention by molding the thermoplastic resin composition of the invention, it is necessary to lower the total light transmittance to obtain a shaped article with excellent jet blackness. To lower the total light transmittance, it is preferable to use two or more kinds of the light absorbing agent (B).

Furthermore, according to combination of two or more kinds of the light absorbing agents that are to be contained in the thermoplastic plastic composition and have different wavelength at which the maximum value of light absorbance is exhibited in a wavelength range of 380 nm or more to 880 nm or less, the total light transmittance can be lowered and also specific color can be displayed by transmitting light with specific wavelength. Specifically, when light having a wavelength of 380 nm to 495 nm is transmitted, violet color to blue color can be displayed. When light having a wavelength of 495 nm to 570 nm is transmitted, green color can be displayed. When light having a wavelength of 570 nm to 620 nm is transmitted, yellow color to orange color can be displayed. When light having a wavelength of 620 nm to 780 nm is transmitted, red color can be displayed.

For having transmission of light with a specific wavelength, it is necessary to prepare a combination of the light absorbing agent. In this regard, the combination of the light absorbing agent can be prepared such that, as described above, when the wavelength at which the maximum value of light absorbance of two or more kinds of the light absorbing agent, which have different wavelength at which the maximum value of light absorbance is exhibited is in a wavelength range of 380 nm or more to 880 nm or less, is aligned in an ascending power, the difference between any neighboring wavelengths among them, or only one of λ(1)–380 nm and 880 nm λ(n) is 180 nm or more in a wavelength range of 380 nm to 880 nm.

Since the light absorbing agent (B) has, in a wavelength range of 380 nm or more to 880 nm or less, the maximum value of light absorbance in the range of 450 nm or more to less than 700 nm, it has no absorption in a long wavelength region of visible light wavelength region, and a near infrared wavelength region. As such, when the combination contains only the light absorbing agent (B), light in this wavelength range having no absorption is transmitted. As such, for preparing a shaped article which transmits visible ray other than red color, it is preferable to combine the light absorbing agent (A) with the light absorbing agent (B).

Furthermore, for preparing a shaped article which transmits red color, it is preferable to combine only the light absorbing agent (B).

Accordingly, by molding the thermoplastic resin composition which satisfies the above requirement 2 or the thermoplastic resin composition which contains at least 1 kind of the light absorbing agent (A) and satisfies the above requirement 1, it is possible to obtain a shaped article which has, in a wavelength range of 380 nm or more to 780 nm or less, the wavelength at which the maximum value of light transmittance is exhibited in a wavelength range of 380 nm or more to less than 680 nm.

Furthermore, by molding a thermoplastic resin which does not contain the light absorbing agent (A), satisfies the above requirement 1, and satisfies Formula (5') in which i satisfying Formula (5) is n, that is, i other than n does not satisfy Formula (5), it is possible to obtain a shaped article which has, in a wavelength range of 380 nm or more to 780 nm or less, the wavelength at which the maximum value of light transmittance is exhibited in a wavelength range of 680 nm or more to 780 nm or less.

[Method for Producing Thermoplastic Resin Composition]

The thermoplastic resin composition of the invention can be prepared by mixing a thermoplastic resin and two or more kinds of light absorbing agents having different wavelength at which the maximum value of light absorbance is exhibited in a wavelength range of 380 nm or more to 880 nm or less. As for the method for mixing, a known method can be used, and by carrying out mixing using a mixer like Henschel mixer, ribbon blender, Banbury mixer, and drum tumbler, and kneading generally for 5 to 60 minutes at melting temperature of 200 to 300° C. using a monoaxial screw extruder, a biaxial screw extruder, a multiaxial screw extruder, or the like, the thermoplastic resin composition of the invention is prepared.

The thermoplastic resin composition of the invention may contain other additives within a range in which the intrinsic performances are not impaired. Examples of other additives include an anti-impact modifier, an ultraviolet ray absorbing agent, a photostabilizer, an anti-oxidant, and a release agent.

Other additives may be used either singly or in combination of two or more kinds thereof.

<Display Device>

Figure 1:
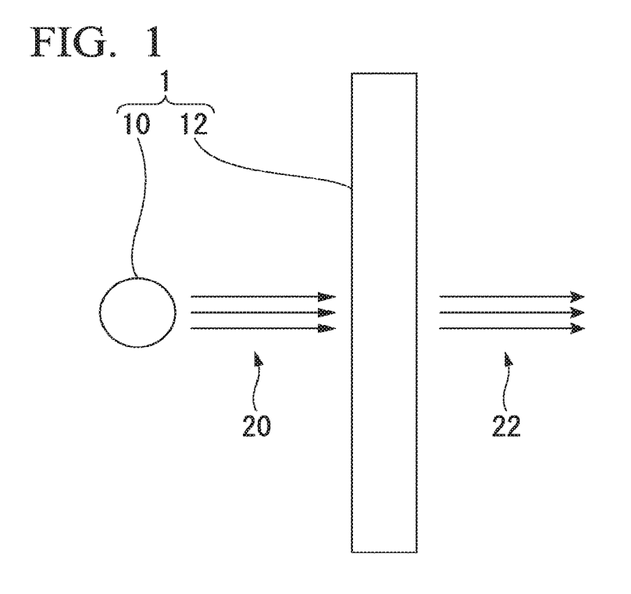
FIG. 1 is a schematic drawing illustrating one example of a display device of the invention.

The display device of the invention may adopt a known mode except that the shaped article of the invention is included therein. FIG. 1 is a schematic drawing illustrating one example of a display device of the invention.

A display device 1 of the invention includes a light source 10, and a shaped article 12, wherein the shaped article 12 of the invention which is arranged so as to allow transmission of light 20 emitted from the light source. Since the shaped article of the invention has excellent jet blackness and can display specific color by transmitting light specific wavelength, even for a case in which a white light source is used as the light source 10, light 22 transmitted through the shaped article 12 after being emitted from the light source becomes colored light, and thus display of colored light can be achieved.

Examples of the white light source include an incandescent lamp, a fluorescent light, an LED lamp, and a HID lamp.

The white light source may be used either singly or in combination of two or more kinds thereof.

The light source 10 which is used for the display device 1 of the invention may be a light source other than white light source. For example, when it is desired to have transmission of red color light, by combining a red light source of which the maximum light emission intensity is present in near infrared wavelength region with the aforementioned shaped article of the invention which transmits red color light, a display device having excellent transmitted light intensity for red color can be obtained.

As for the red light source, from the viewpoint of having excellent transmitted light intensity of red color light, the red light source having the maximum light emission intensity wavelength is exhibited in a range of 710 nm or more to 800 nm or less are preferable, and the red light source having the maximum light emission intensity wavelength is exhibited in a range of 720 nm or more to 780 nm or less are more preferable. Examples of the red light source include an LED lamp.

The red light source may be used either singly or in combination of two or more kinds thereof.

It is sufficient that the light source 10 and the shaped article 12 are present with a distance between them allowing naked eye confirmation of the color of the light 22 transmitted through the shaped article 12. Although it is not particularly limited, the distance is preferably 0.1 cm or more and 100 cm or less because it is not necessary to increase the light intensity of a light source to an ultimate level. It is more preferably 0.1 cm or more and 30 cm or less.

EXAMPLES

Hereinbelow, the invention is specifically described by way of examples, but the invention is not limited to those examples.

(Materials for Producing Thermoplastic Resin Composition)

Thermoplastic resin: acrylic resin (product name: "ACRYPET (registered trademark) VH", manufactured by Mitsubishi Rayon Co., Ltd.)

The light absorbing agent (A): an anthraquinone pigment (product name: "SDO-11", manufactured by ARIMOTO CHEMICAL CO., LTD., wavelength at which the maximum value of light absorbance is exhibited: 755 nm)

The light absorbing agent (B):

The light absorbing agent (B1): an anthraquinone dye (product name: "MACROLEX (registered trademark) Green G", manufactured by LANXESS, wavelength at which the maximum value of light absorbance is exhibited: 690 nm)

The absorbing agent (B2): an anthraquinone dye (product name: "DIARESIN (registered trademark) Blue N", manufactured by Mitsubishi Chemical Corporation, wavelength at which the maximum value of light absorbance is exhibited: 620 nm)

The light absorbing agent (B3): an anthraquinone dye (product name: "DIARESIN (registered trademark) Blue G", manufactured by Mitsubishi Chemical Corporation, wavelength at which the maximum value of light absorbance is exhibited: 590 nm)

The light absorbing agent (B4): an anthraquinone dye (product name: "SUMIPLAST (registered trademark) Violet RR", manufactured by Sumika Chemtex Co., Ltd., wavelength at which the maximum value of light absorbance is exhibited: 560 nm)

The light absorbing agent (B5): a perinone dye (product name: "DIARESIN (registered trademark) Red A", manufactured by Mitsubishi Chemical Corporation, wavelength at which the maximum value of light absorbance is exhibited: 480 nm)

The light absorbing agent (B6): a perinone dye (product name: "DIARESIN (registered trademark) Orange HS", manufactured by Mitsubishi Chemical Corporation, wavelength at which the maximum value of light absorbance is exhibited: 450 nm)

Carbon black: carbon black (product name: "Carbon black #45", manufactured by Mitsubishi Chemical Corporation)

(Measurement of Transmittance)

Transmittance of a shaped article for light with a wavelength of 380 nm or more to 780 nm or less was measured by transmitting light with a wavelength of 380 nm or more to 780 nm or less through a rear surface of a shaped article and measuring the light transmitted through the surface of a shaped article by using a spectrophotometric colorimeter (model name: "U4100", manufactured by Hitachi High-Technologies Corporation).

(Measurement of L* Value)

L* value of reflected light of a shaped article was calculated from tristimulus values X, Y, and Z that are measured by reflection measurement at conditions including C light source and viewing angle of 2° using spectrophotometric colorimeter (model name: "U4100", manufactured by Hitachi High-Technologies Corporation) in conformity with ISO 11664-4. Incidentally, the reflection measurement was made by collecting light based on integration of specular reflection components and diffuse reflection components using an integrating sphere.

(Measurement of Total Light Transmittance)

Total light transmittance of a shaped article was measured by using a transmittance meter (model name: "HM-100", manufactured by MURAKAMI COLOR RESEARCH LABORATORY CO., LTD.) in conformity with ISO 13468-1.

Incidentally, "0%" shown in Table 3 indicates a low value that is beyond the detection limit, and from the reading precision of the above transmittance meter, it is at least 0.1% or less.

(Measurement of Color of Transmitted Light)

White light (LED lamp, product name of "MAGLITE ST2D") was transmitted through a rear surface of a shaped article, and color of the light transmitted through the surface of a shaped article was determined with a naked eye.

(Measurement of Glossiness)

Gloss of a shaped article was measured by using a gloss meter (model name: "GM26PRO", manufactured by MURAKAMI COLOR RESEARCH LABORATORY CO., LTD.) in conformity with ISO 2813.

(Measurement of Transmitted Light Intensity)

Each light source of an LED lamp which has the maximum light emission intensity wavelength of 700 nm (product name: "SL700CAXA2", manufactured by ALPHA-ONE ELECTRONICS LTD.) and an LED lamp which has the maximum light emission intensity wavelength of 740 nm (product name: "SL740CAXA4", manufactured by ALPHA-ONE ELECTRONICS LTD.) was allowed to generate light by regulated DC power supply (manufactured by Metronix, current value: 20 mA), and the resulting light was allowed to be transmitted through a rear surface of a shaped article. Then, by using an electricity measurement device (model name: "Optical Power Meter ML910A", manufactured by Anritsu Corporation), transmitted light intensity at each of 660 nm, 700 nm, and 740 nm was measured. The distance between the light source and the shaped article was set at 30 mm, and the distance between the shaped article and the electricity measurement device was set at 50 mm.

Example 1

100 Parts by mass of a thermoplastic resin, 0.04 part by mass of the light absorbing agent (A), 0.15 part by mass of the light absorbing agent (B1), and 0.1 part by mass of the light absorbing agent (B6) were admixed with one another by using a Henschel mixer (model name: "SMV-20", manufactured by KAWATAMFG CO LTD.). After that, by using a biaxial extruder (model name: "PCM45", manufactured by Ikegai Corp.), kneading was performed at melting temperature of 250° C. to obtain pellets of a thermoplastic resin composition.

The obtained pellets of a thermoplastic resin composition were subjected to injection molding at cylinder temperature of 250° C. and mold temperature of 60° C. by using an injection molding machine (model name: "SAV-60", manufactured by SANJO SEIKI CO., LTD.) to obtain a shaped article as a flat plate (size: 100 mm×50 mm, thickness of 2 mm).

Evaluation results of the obtained shaped article are shown in Table 3.

Furthermore, the transmittance of the obtained shaped article for light with a wavelength of 380 nm or more to 780 nm or less was shown in FIG. 2.

Examples 2 to 7 and Comparative Examples 1 to 5

A shaped article was obtained in the same manner as Example 1 except that the light absorbing agent for use is modified to those described in Table 1. Incidentally, the numbers given in the table indicate the content (parts by mass).

Evaluation results of the obtained shaped article are shown in Table 3.

Furthermore, the transmittance of the shaped article obtained in Examples 2 to 7 for light with a wavelength of 380 nm or more to 780 nm or less was shown in each of FIGS. 3 to 8. Meanwhile, the shaped article obtained from Comparative Examples 1 and 3 to 5 did not allow transmission of light with a wavelength of 380 nm or more to 780 nm or less.

Incidentally, the wavelength at which the light absorbance of the light absorbing agent included in example exhibits the maximum value, and the relationship between Formula (5), Formula (6), and Formula (7) are shown in Table 2. Regarding the column of "Formula (5)" in Table 2, ○ indicates that Formula (5) ($\lambda(i+1)-\lambda(i) \geq 180$ nm) is satisfied by only one $\lambda(i+1)-\lambda(i)$, while x indicates that the formula is not satisfied by any $\lambda(i+1)-\lambda(i)$. Furthermore, regarding the columns of "Formula (6)" and "Formula (7)" in Table 2, ○ indicates that Formula (6) ($\lambda(1)-380$ nm<180 nm) or Formula (7) ($\lambda(1)-380$ nm≥180 nm) is satisfied while x indicates that the formulae are not satisfied.

TABLE 1

| | Thermoplastic resin | Light absorbing agent $\lambda(i)$ (nm) | | | | | | | |
| --- | --- | --- | --- | --- | --- | --- | --- | --- | --- |
| | | (A) 755 | (B1) 690 | (B2) 620 | (B3) 590 | (B4) 560 | (B5) 480 | (B6) 450 | Carbon black |
| Example 1 | 100 | 0.04 | 0.15 | — | — | — | — | 0.1 | — |
| Example 2 | 100 | 0.04 | — | 0.15 | 0.15 | — | — | — | — |
| Example 3 | 100 | 0.04 | — | — | — | 0.1 | — | 0.1 | — |
| Example 4 | 100 | 0.1 | 0.1 | — | — | — | — | 0.1 | — |
| Example 5 | 100 | 0.1 | — | — | — | — | 0.15 | — | — |
| Example 6 | 100 | 0.1 | 0.22 | — | — | — | — | — | — |
| Example 7 | 100 | — | 0.1 | — | 0.025 | — | 0.1 | — | — |
| Comparative Example 1 | 100 | 0.04 | 0.5 | — | — | — | — | 0.5 | — |
| Comparative Example 2 | 100 | 0.04 | 0.01 | — | — | — | — | 0.01 | — |
| Comparative Example 3 | 100 | 0.04 | — | 0.2 | — | — | 0.2 | — | — |
| Comparative Example 4 | 100 | 0.04 | 0.1 | 0.1 | 0.1 | 0.1 | 0.1 | — | — |
| Comparative Example 5 | 100 | — | — | — | — | — | — | — | 0.1 |

TABLE 2

| | (nm) | λ(1) | λ(2) | λ(3) | λ(4) | λ(5) | λ(6) | λ(7) | Formula (5) | Formula (6) | Formula (7) |
|---|---|---|---|---|---|---|---|---|---|---|---|
| Example 1 | Wavelength | 450 | | 690 | | 755 | | 880 | — | — | — | — | ○ | ○ | X |
| | λ(i+1)-λ(i) | — | 240 | | 65 | | 125 | | — | — | — | — | | | |
| Example 2 | Wavelength | 590 | | 620 | | 755 | | 880 | — | — | — | — | X | X | ○ |
| | λ(i+1)-λ(i) | — | 30 | | 135 | | 125 | | — | — | — | — | | | |
| Example 3 | Wavelength | 450 | | 560 | | 755 | | 880 | — | — | — | — | ○ | ○ | X |
| | λ(i+1)-λ(i) | — | 110 | | 195 | | 125 | | — | — | — | — | | | |
| Example 4 | Wavelength | 450 | | 690 | | 755 | | 880 | — | — | — | — | ○ | ○ | X |
| | λ(i+1)-λ(i) | — | 240 | | 65 | | 125 | | — | — | — | — | | | |
| Example 5 | Wavelength | 480 | | 755 | | 880 | — | — | — | — | — | — | ○ | ○ | X |
| | λ(i+1)-λ(i) | — | 275 | | 125 | | — | — | — | — | — | — | | | |
| Example 6 | Wavelength | 690 | | 755 | | 880 | — | — | — | — | — | — | X | X | ○ |
| | λ(i+1)-λ(i) | — | 65 | | 125 | | — | — | — | — | — | — | | | |
| Example 7 | Wavelength | 480 | | 590 | | 690 | | 880 | — | — | — | — | ○ | ○ | X |
| | λ(i+1)-λ(i) | — | 110 | | 100 | | 190 | | — | — | — | — | | | |
| Comparative Example 1 | Wavelength | 450 | | 690 | | 755 | | 880 | — | — | — | — | ○ | ○ | X |
| | λ(i+1)-λ(i) | — | 240 | | 65 | | 125 | | — | — | — | — | | | |
| Comparative Example 2 | Wavelength | 450 | | 690 | | 755 | | 880 | — | — | — | — | ○ | ○ | X |
| | λ(i+1)-λ(i) | — | 240 | | 65 | | 125 | | — | — | — | — | | | |
| Comparative Example 3 | Wavelength | 480 | | 620 | | 755 | | 880 | — | — | — | — | X | ○ | X |
| | λ(i+1)-λ(i) | — | 140 | | 135 | | 125 | | — | — | — | — | | | |
| Comparative Example 4 | Wavelength | 480 | 560 | 590 | 620 | 690 | 755 | 880 | X | ○ | X |
| | λ(i+1)-λ(i) | — | 80 | 30 | 30 | 70 | 65 | 125 | | | |
| Comparative Example 5 | Wavelength | — | — | — | — | — | — | — | — | — | — |
| | λ(i+1)-λ(i) | — | — | — | — | — | — | — | | | |

TABLE 3

| | $T_\alpha$ (%) | $T_\beta$ (%) | Wavelength at which the maximum transmittance is exhibited (nm) | L* value | Total light transmittance (%) | Color of transmitted light | Glossiness (%) | Color observed by naked eye |
|---|---|---|---|---|---|---|---|---|
| Example 1 | 0.2 | 0 | 540 | 27 | 0 | Green color | 89 | Jet black color |
| Example 2 | 0.6 | 0.2 | 445 | 27 | 0 | Blue color | 88 | Jet black color |
| Example 3 | 1.0 | 0.2 | 640 | 27 | 0 | Red color | 88 | Jet black color |
| Example 4 | 0.3 | 0 | 545 | 26 | 0 | Green color | 88 | Jet black color |
| Example 5 | 0.6 | 0 | 590 | 26 | 0 | Yellow color | 87 | Jet black color |
| Example 6 | 0.6 | 0 | 510 | 26 | 0 | Green color | 88 | Jet black color |
| Example 7 | 0 | 92.0 | 780 | 27 | 0 | Red color | 87 | Jet black color |
| Comparative Example 1 | — | — | — | 26 | 0 | — | 89 | Jet black color |
| Comparative Example 2 | 31 | 0.1 | 540 | 32 | 17 | Green color | 85 | Grey color |
| Comparative Example 3 | — | — | — | 27 | 0 | — | 88 | Jet black color |
| Comparative Example 4 | — | — | — | 27 | 0 | — | 88 | Jet black color |
| Comparative Example 5 | — | — | — | 28 | 0 | — | 85 | Jet black color |

The shaped article of the invention, which has been obtained in Examples 1 to 7 has excellent jet blackness and also, as shown in FIGS. 2 to 8, was able to transmit light with specific wavelength to exhibit specific color.

The shaped article obtained in Comparative Example 1, in which there is only one i satisfying Formula (5), and although Formula (6) is satisfied, each of the light absorbing agent (B) has high content and also the total content of the light absorbing agent (B) is high, was not able to transmit light with a wavelength of 380 nm or more to 780 nm or less, and therefore color of light transmitted through the shaped article cannot be confirmed with a naked eye.

The shaped article obtained in Comparative Example 2, in which there is only one i satisfying Formula (5), and although Formula (6) is satisfied, the total content of the light absorbing agent (B) is low, was able to transmit light with a specific wavelength to exhibit specific color. However, the total light transmittance was high and jet blackness was poor.

The shaped article obtained in Comparative Example 3 or Comparative Example 4, in which content of each of the light absorbing agent and total content of the light absorbing agent (B) are within a suitable range, but there is no i satisfying Formula (5) and Formula (6) is not satisfied, was not able to transmit light with a wavelength of 380 nm or more to 780 nm or less, and therefore color of light transmitted through the shaped article cannot be confirmed with a naked eye.

The shaped article obtained in Comparative Example 5, in which carbon black is blended, was not able to transmit light with a wavelength of 380 nm or more to 780 nm or less, and therefore color of light transmitted through the shaped article cannot be confirmed with a naked eye.

Examples 8 and 9

Measurement of transmitted light intensity was carried out for the shaped article which has been obtained in Example 7. The results are shown in Table 4.

TABLE 4

| | Display device | | | |
|---|---|---|---|---|
| | Light source Maximum light emission intensity (nm) | 660 nm transmitted light intensity (μW) | 700 nm transmitted light intensity (μW) | 740 nm transmitted light intensity (μW) |
| Example 8 | 700 | 0.945 | 0.769 | 0.780 |
| Example 9 | 740 | 35.3 | 32.2 | 32.7 |

The shaped article of the invention which has been obtained in Example 7 exhibited excellent jet-blackness, and also, by allowing transmission of light with specific wavelength, it was able to display a specific color. In particular, by using a light source of which the maximum light emission intensity is present at a wavelength of 740 nm, the transmitted light intensity for red color light was significantly improved.

INDUSTRIAL APPLICABILITY

The shaped article of the invention has excellent jet blackness, and also, by allowing transmission of light with specific wavelength, it can display specific color. As such, the shaped article of the invention can be preferably used for a display device for displaying letters, numbers, signals, or the like; an exterior part of an automobile such as filler, garnish, front grille, bumper, or mold; and an exterior member requiring luxurious outer appearance or the like, and it can be particularly preferably used for a display device.

EXPLANATIONS OF LETTERS OR NUMERALS

1 Display device
10 Light source
12 Molded article
20 Light emitted from light source
22 Light transmitted through shaped article after being emitted from light source

The invention claimed is:

1. A shaped article in which an L* value of reflected light is 35 or less, wherein:
the shaped article is obtained by molding a thermoplastic resin composition comprising:
a thermoplastic resin; and
two or more kinds of light absorbing agents each of which has a maximum absorbance wavelength different from each other, provided that the maximum absorbance wavelength is a wavelength at which the maximum value of light absorbance is exhibited in a wavelength range of 380 nm or more to 880 nm or less,
wherein the thermoplastic resin is an acrylic resin,
at least one of the light absorbing agents comprises a light absorbing agent (B) which has the maximum absorbance wavelength in a wavelength range of 450 nm or more and less than 700 nm, and a total content of the light absorbing agent (B) is 0.1 part by mass or more and 0.5 part by mass or less relative to 100 parts by mass of the thermoplastic resin,
a total light transmittance of the shaped article is 1% or less, and
in a wavelength range of 380 nm or more to 780 nm or less, the wavelength at which the maximum value of light transmittance is exhibited for the shaped article is in a range of 380 nm or more to less than 680 nm, and Formulae (1) and (2) are satisfied Formula (1):

$$T_\alpha \geq 0.1\% \tag{1}$$

Formula (2):

$$0\% \leq T_\beta \leq T_\alpha/2 \tag{2}$$

wherein in the formulae, $T_\alpha$ is the maximum value of light transmittance in a wavelength range of 380 nm or more to less than 680 nm, and $T_\beta$ is the maximum value of light transmittance in a wavelength range of 680 nm or more to 780 nm or less.

2. A shaped article in which an L* value of reflected light is 35 or less, wherein:
the shaped article is obtained by molding a thermoplastic resin composition comprising:
a thermoplastic resin; and
two or more kinds of light absorbing agents each of which has a maximum absorbance wavelength different from each other, provided that the maximum absorbance wavelength is a wavelength at which the maximum value of light absorbance is exhibited in a wavelength range of 380 nm or more to 880 nm or less,
wherein the thermoplastic resin is an acrylic resin,
at least one of the light absorbing agents comprises a light absorbing agent (B) which has the maximum absorbance wavelength in a wavelength range of 450 nm or more to less than 700 nm, and a total content of the light absorbing agent (B) is 0.1 part by mass or more and 0.5 part by mass or less relative to 100 parts by mass of the thermoplastic resin,
a total light transmittance of the shaped articles 1% or less, and
in a wavelength range of 380 nm or more to 780 nm or less, the wavelength at which the maximum value of light transmittance is exhibited for the shaped article is in a range of 680 nm or more to 780 nm or less, and Formulae (3) and (4) are satisfied Formula (3):

$$T_\beta \geq 10\% \tag{3}$$

Formula (4):

$$0\% \leq T_\alpha \leq T_\beta/2 \tag{4}$$

wherein in the formulae, $T_\alpha$ is the maximum value of light transmittance in a wavelength range of 380 nm or more to less than 680 nm, and $T_\beta$ is the maximum value of light transmittance in a wavelength range of 680 nm or more to 780 nm or less.

3. A thermoplastic resin composition comprising:
a thermoplastic resin; and
two or more kinds of light absorbing agents, each of which has a maximum absorbance wavelength different from each other, provided that the maximum absorbance wavelength is a wavelength at which the maximum value of light absorbance is exhibited in a wavelength range of 380 nm or more to 880 nm or less,
wherein the thermoplastic resin is an acrylic resin, and
at least one of the light absorbing agents comprises a light absorbing agent (B) which has the maximum absorbance wavelength in a wavelength range of 450 nm or more to less than 700 nm and satisfies either Requirement 1 or Requirement 2, and a total content of the light absorbing agent (B) is 0.1 part by mass or more and 0.5 part by mass or less relative to 100 parts by mass of the thermoplastic resin, Requirement 1:
there is only one light absorbing agent (i) satisfying Formula (5), and, Formula (6) is satisfied Formula (5):

$$\lambda(i+1)-\lambda(i) \geq 180 \text{ nm} \quad (5)$$

Formula (6):

$$\lambda(1)-380 \text{ nm} < 180 \text{ nm} \quad (6)$$

Requirement 2:
there is no light absorbing agent (i) satisfying Formula (5), and Formula (7) is satisfied Formula (5):

$$\lambda(i+1)-\lambda(i) \geq 180 \text{ nm} \quad (5)$$

Formula (7):

$$\lambda(1)-380 \text{ nm} \geq 180 \text{ nm} \quad (7)$$

wherein in the formulae, $\lambda(i)$ represents a wavelength of a light absorbing agent (i), which is one of the light absorbing agents, the wavelength at which the maximum value of light absorbance is exhibited in a wavelength range of 450 nm or more to 850 nm or less, i is an integer of 1 to n, n is an integer of 2 or more which represents the number of the kind of the light absorbing agents included in the thermoplastic resin composition, $\lambda(n+1)$ is 880 nm, and $\lambda(1) < \lambda(2) < \ldots < \lambda(n)$.

4. The thermoplastic resin composition according to claim 3, wherein at least one of the light absorbing agents comprises a light absorbing agent (A) which has the maximum absorbance wavelength in a range of 700 nm or more to 850 nm or less.

5. The thermoplastic resin composition according to claim 4, wherein a total content of the light absorbing agent (A) is 0.001 part by mass or more and 1 part by mass or less relative to 100 parts by mass of the thermoplastic resin.

6. The thermoplastic resin composition according to claim 3, wherein the two or more kinds of light absorbing agents each independently consist of the light absorbing agent (B).

7. The thermoplastic resin composition according to claim 3, wherein a content of each of the light absorbing agents (B) is 0.01 part by mass or more and 0.45 part by mass or less relative to 100 parts by mass of the thermoplastic resin.

8. The thermoplastic resin composition according to claim 3, wherein the requirement 1 is satisfied.

9. The thermoplastic resin composition according to claim 3, wherein the requirement 2 is satisfied.

10. The thermoplastic resin composition according to claim 4, wherein the light absorbing agent (A) comprises at least one light absorbing agent selected from the group consisting of an anthraquinone pigment and a phthalocyanin pigment.

11. The thermoplastic resin composition according to claim 3, wherein the light absorbing agent (B) comprises at least one light absorbing agent selected from the group consisting of an anthraquinone dye, a perinone dye, a methine dye, and a quinophthalone dye.

12. A shaped article obtained by molding the thermoplastic resin composition according to claim 3.

13. The shaped article according to claim 1, wherein a glossiness of the shaped article is 80% or more.

14. A shaped article according to claim 1, wherein:
the shaped article has an L* value of reflected light of 35 or less and a total light transmittance of 1% or less, and
light emitted from a white light source becomes colored light after transmission through the shaped article.

15. A display device comprising a light source, and the shaped article according to claim 1, in which the shaped article is arranged so as to allow transmission of the light emitted from the light source.

16. A display device comprising a red light source and a shaped article,
wherein the maximum light emission intensity of the red light source is present in a wavelength range of 710 nm or more to 800 nm or less, and
the shaped article is obtained by molding the thermoplastic resin composition according to claim 8, and
the shaped article is arranged so as to allow transmission of light emitted from the red light source, and
the only one light absorbing agent (i) satisfying Formula (5) is light absorbing agent (n).

17. A shaped article according to claim 2, wherein:
the shaped article has an L* value of reflected light of 35 or less and a total light transmittance of 1% or less, and
light emitted from a white light source becomes colored light after transmission through the shaped article.

18. A shaped article according to claim 12, wherein:
the shaped article has an L* value of reflected light of 35 or less and a total light transmittance of 1% or less, and
light emitted from a white light source becomes colored light after transmission through the shaped article.

* * * * *